(12) United States Patent
Yamaji et al.

(10) Patent No.: US 10,361,433 B2
(45) Date of Patent: Jul. 23, 2019

(54) POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY INCLUDING THE SAME

(71) Applicant: SUMITOMO METAL MINING CO., LTD., Tokyo (JP)

(72) Inventors: Koji Yamaji, Niihama (JP); Ryozo Ushio, Niihama (JP); Takehide Honma, Niihama (JP); Satoshi Yoshio, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 86 days.

(21) Appl. No.: 15/527,411

(22) PCT Filed: Nov. 13, 2015

(86) PCT No.: PCT/JP2015/082031
§ 371 (c)(1),
(2) Date: May 17, 2017

(87) PCT Pub. No.: WO2016/080320
PCT Pub. Date: May 26, 2016

(65) Prior Publication Data
US 2018/0331358 A1 Nov. 15, 2018

(30) Foreign Application Priority Data
Nov. 18, 2014 (JP) .................................. 2014-233393

(51) Int. Cl.
*H01M 4/52* (2010.01)
*H01M 4/525* (2010.01)
(Continued)

(52) U.S. Cl.
CPC .............. *H01M 4/525* (2013.01); *C01G 9/02* (2013.01); *C01G 53/00* (2013.01); *C01G 53/42* (2013.01);
(Continued)

(58) Field of Classification Search
CPC ...... H01M 4/252; H01M 4/366; H01M 4/505; H01M 4/131; H01M 10/0525;
(Continued)

(56) References Cited

U.S. PATENT DOCUMENTS

| 2011/0052991 | A1 | 3/2011 | Kim et al. | |
| 2013/0288121 | A1* | 10/2013 | Nagai | H01M 4/13 429/211 |

(Continued)

FOREIGN PATENT DOCUMENTS

| JP | 2000-323122 A | 11/2000 |
| JP | 2003-059489 A | 2/2003 |

(Continued)

OTHER PUBLICATIONS

International Search Report dated Dec. 8, 2015, issued in counterpart International Application No. PCT/JP2015/082031. (2 pages).

(Continued)

*Primary Examiner* — Amanda C. Walke
(74) *Attorney, Agent, or Firm* — Westerman, Hattori, Daniels & Adrian, LLP

(57) ABSTRACT

A positive electrode active material for a nonaqueous electrolyte secondary battery contains lithium nickel cobalt zinc composite oxide represented by general formula (1): $Li_w Ni_{1-x-y-z}Co_xZn_yM_zO_2$ ($0.95 \leq w \leq 1.10$, $0.05 \leq x \leq 0.3$, $0.005 \leq y \leq 0.08$, and $0 \leq z \leq 0.3$, where M is at least one metal element selected from the group consisting of Mg, Al, Ti, Mn, Fe, and Cu), wherein the lithium nickel cobalt zinc composite oxide has a form of secondary particles each corresponding to an (Continued)

aggregation of primary particles of hexagonal lithium-containing composite oxide with a layered structure, contains zinc oxide on at least a part of a surface of the primary particles and/or a surface of the secondary particles, and has a (003)-plane crystallite diameter of 100 nm or larger and 160 nm or smaller, the diameter being obtained by X-ray diffraction and the Scherrer equation.

9 Claims, 2 Drawing Sheets

(51) Int. Cl.
| | |
|---|---|
| *C01G 53/00* | (2006.01) |
| *H01M 4/36* | (2006.01) |
| *H01M 4/505* | (2010.01) |
| *H01M 10/0525* | (2010.01) |
| *C01G 9/02* | (2006.01) |
| *H01M 4/02* | (2006.01) |

(52) U.S. Cl.
CPC ............. *C01G 53/50* (2013.01); *H01M 4/36* (2013.01); *H01M 4/366* (2013.01); *H01M 4/505* (2013.01); *H01M 10/0525* (2013.01); *C01P 2002/60* (2013.01); *C01P 2004/32* (2013.01); *C01P 2004/50* (2013.01); *C01P 2004/61* (2013.01); *C01P 2004/84* (2013.01); *C01P 2006/40* (2013.01); *H01M 2004/021* (2013.01); *H01M 2004/028* (2013.01)

(58) Field of Classification Search
CPC ....... H01M 10/0567; H01M 2004/028; H01M 4/525; C01G 53/42; C01P 2002/60; C01P 2004/61; C01P 2004/84
USPC ........................................................ 429/223
See application file for complete search history.

(56) References Cited

U.S. PATENT DOCUMENTS

| | | | |
|---|---|---|---|
| 2014/0050976 A1* | 2/2014 | Nagai | .................. H01M 4/131 429/211 |
| 2016/0020458 A1* | 1/2016 | Choi | ................. H01M 10/0525 252/182.1 |

FOREIGN PATENT DOCUMENTS

| | | |
|---|---|---|
| JP | 2011-526732 A | 10/2011 |
| JP | 2012-109205 A | 6/2012 |
| JP | 2013-206553 A | 10/2013 |

OTHER PUBLICATIONS

International Preliminary Report on Patentability (Form PCT/IB/373) issued in counterpart International Application No. PCT/JP2015/082031dated May 23, 2017, with Form PCT/ISA/237. (4 pages).

* cited by examiner

POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY INCLUDING THE SAME

TECHNICAL FIELD

The present invention relates to a positive electrode active material for a nonaqueous electrolyte secondary battery, a method for producing the same, and a nonaqueous electrolyte secondary battery.

BACKGROUND ART

With the recent wide spread use of portable electronic devices such as mobile phones and laptop computers, the development of small and light-weight nonaqueous electrolyte secondary batteries having high energy density has been strongly demanded. Moreover, the development of secondary batteries with high output energy serving as the batteries for electric vehicles typified by hybrid vehicles has been strongly demanded. One of the secondary batteries that satisfy these demands is a lithium ion secondary battery. A nonaqueous electrolyte secondary battery typified by a lithium ion secondary battery includes a negative electrode, a positive electrode, an electrolyte solution, and the like, and contains a material capable of intercalation and deintercalation of lithium as the active material of the negative electrode and the positive electrode.

The positive electrode active material for a nonaqueous electrolyte secondary battery has been extensively researched and developed recently. Above all, the practical application of the nonaqueous electrolyte secondary battery whose positive electrode material contains a lithium-containing composite oxide with a layered structure or a spinel structure has been advanced as the battery with the high energy density because a voltage as high as 4 V can be obtained.

A number of developments have been conducted on the battery containing lithium cobalt composite oxide ($LiCoO_2$), which can be synthesized relatively easily, as the positive electrode material of the lithium-containing composite oxide in order to achieve an excellent initial capacity characteristic or cycle characteristics, and various results have already been obtained. However, the lithium cobalt composite oxide is formed using a cobalt compound for its raw material, and since the cobalt compound is rare and expensive, the cost for the active material and moreover the batteries will increase. In view of this, the replacement for the active material has been expected.

Thus, lithium nickel composite hydroxide ($LiNiO_2$) containing nickel, which is less expensive than cobalt, has attracted attention and a higher capacity can be expected from this material. The lithium nickel composite hydroxide is excellent in terms of cost, and moreover has a lower electrochemical potential than the lithium cobalt composite oxide; therefore, the decomposition of the lithium nickel composite hydroxide due to the oxidation of the electrolyte solution is less problematic. In addition, the lithium nickel composite hydroxide can be expected to have a higher capacity and exhibits a battery voltage as high as that of the lithium cobalt composite oxide; therefore, the development of the lithium nickel composite hydroxide has been extensively carried out. The nonaqueous electrolyte secondary battery employing the lithium nickel composite hydroxide containing only nickel as a metal other than lithium has some drawbacks: the cycle characteristic is inferior to that of the nonaqueous electrolyte secondary battery containing the lithium cobalt composite oxide; and the battery performance easily deteriorates if the nonaqueous electrolyte secondary battery employing the lithium nickel composite hydroxide is used or preserved under a high-temperature environment.

In order to overcome such drawbacks, for example, Patent Literature 1 has disclosed the positive electrode active material for a nonaqueous electrolyte secondary battery, which is represented by $LiNi_{1-x-y}Co_xZn_yO_2$ ($0<x\leq0.20$, $0<y\leq0.13$), containing hexagonal lithium-containing composite oxide with a layered structure, and having 3% or less of the site occupation ratio of metal ions other than lithium in 3a-site.

Patent Literature 2 has provided the positive electrode active material for a lithium secondary battery including a plurality of primary particles containing lithium composite oxide with a layered rock salt structure containing at least lithium, nickel, and an element selected from cobalt and zinc. In the provided positive electrode active material for a lithium secondary battery, at least one of the positive electrode active material for a lithium secondary battery and the primary particles has higher cobalt concentration in a part near the surface than the inside, and the cobalt element may be partly or entirely replaced by the zinc element.

CITATION LIST

Patent Literature

[Patent Literature 1] Japanese Unexamined Patent Application Publication No. 2000-323122
[Patent Literature 2] Japanese Unexamined Patent Application Publication No. 2003-59489

SUMMARY OF INVENTION

Technical Problem

The positive electrode active material disclosed in Patent Literature 1 contains lithium nickel cobalt zinc composite oxide and has excellent high-temperature stability while maintaining a high initial capacity and cycle characteristic. However, Patent Literature 1 does not describe the existence form and the distribution of zinc in the positive electrode active material, and the cycle characteristic thereof is not sufficiently examined. According to Patent Literature 2, when the cobalt concentration of a part of the positive electrode active material near the surface thereof is higher than that of the inside part, the crystal structure near the surface is stabilized and therefore the cycle characteristic is improved. However, Patent Literature 2 does not describe the existence form and the distribution of zinc in the positive electrode active material, and further improvement of the cycle characteristic has been anticipated.

The present invention has been made in view of the above problems, and it is an object to provide a positive electrode active material for a nonaqueous electrolyte secondary battery, by which a nonaqueous electrolyte secondary battery having a superior cycle characteristic and deteriorating less in capacity after repeated charging and discharging can be obtained.

Solution to Problem

To solve the above problems, the present inventors have eagerly conducted studies on the influence on the charging-discharging characteristics including the cycle characteristic of the positive electrode active material for a nonaqueous electrolyte secondary battery, and have found out that the cycle characteristic can be improved by forming zinc oxide on a surface of secondary particles or a surface of the primary particles (grain boundary) included in the positive electrode active material for a nonaqueous electrolyte secondary battery. In addition, the present inventors have found out that the above positive electrode active material can be obtained by using composite hydroxide particles containing cobalt and nickel with the surface of the secondary particles covered with zinc hydroxide, as the precursor of the positive electrode active material, and thus completed the present invention.

That is to say, a positive electrode active material for a nonaqueous electrolyte secondary battery according to the present invention includes lithium nickel cobalt zinc composite oxide represented by general formula (1): $Li_wNi_{1-x-y-z}Co_xZn_yM_zO_2$ ($0.95 \le w \le 1.10$, $0.05 \le x \le 0.3$, $0.005 \le y \le 0.08$, and $0 \le z \le 0.3$, where M is at least one metal element selected from the group consisting of Mg, Al, Ti, Mn, Fe, and Cu), in which the lithium nickel cobalt zinc composite oxide has a form of secondary particles each corresponding to an aggregation of primary particles of hexagonal lithium-containing composite oxide with a layered structure, contains zinc oxide on at least a part of a surface of the primary particles and/or a surface of the secondary particles, and has a (003)-plane crystallite diameter of 100 nm or larger and 160 nm or smaller, the diameter being obtained by X-ray diffraction and the Scherrer equation.

It is preferable that the (003)-plane crystallite diameter is 120 nm or larger and 150 nm or smaller. Moreover, it is preferable that the secondary particles have an average particle diameter of 3 μm or larger and 15 μm or smaller, and the indication [(d90−d10)/average particle diameter] expressing spread of a particle size distribution is 1.2 or less.

A method for producing a positive electrode active material for a nonaqueous electrolyte secondary battery according to the present invention includes a step of mixing a lithium compound with a precursor of the positive electrode active material or a roasted precursor obtained by oxidizing roasting of the precursor to obtain a lithium mixture, and a step of firing the lithium mixture obtained in the mixing in an oxidizing atmosphere, in which the precursor contains nickel composite hydroxide represented by general formula (2): $Ni_{1-x-y-z}Co_xZn_yM_z(OH)_2$ ($0.05 \le x \le 0.3$, $0.005 \le y \le 0.08$, $0 \le z \le 0.3$, where M is at least one metal element selected from the group consisting of Mg, Al, Ti, Mn, Fe, and Cu), has a form of secondary particles each corresponding to an aggregation of primary particles, and has at least a part of a surface of the secondary particles coated with zinc hydroxide.

It is preferable that the precursor is obtained by dropping an aqueous solution containing zinc to slurry of the secondary particles with a surface not coated with zinc hydroxide while the pH of the slurry is maintained at 8.5 or higher and 10.5 or lower, and coating at least a part of the surface of the secondary particles with zinc hydroxide.

In addition, it is preferable that the pH of the slurry is maintained at 9.0 or higher and 10.0 or lower.

Furthermore, it is preferable that the lithium compound is lithium hydroxide and/or a hydrate thereof. In the step of firing, the lithium mixture is fired preferably in a range of 700° C. or higher and 830° C. or lower.

A nonaqueous electrolyte secondary battery according to the present invention includes the aforementioned positive electrode active material for a nonaqueous electrolyte secondary battery for a positive electrode.

Advantageous Effects of the Invention

In the positive electrode active material for a nonaqueous electrolyte secondary battery according to the present invention, deterioration in capacity after repeated charging and discharging can be suppressed. In addition, the nonaqueous electrolyte secondary battery including this positive electrode active material has a high initial capacity and an excellent cycle characteristic, and its industrial value is considerably high. In addition, the method for producing the positive electrode active material according to the present invention enables easy production of the positive electrode active material.

DESCRIPTION OF EMBODIMENTS

Figure 1:
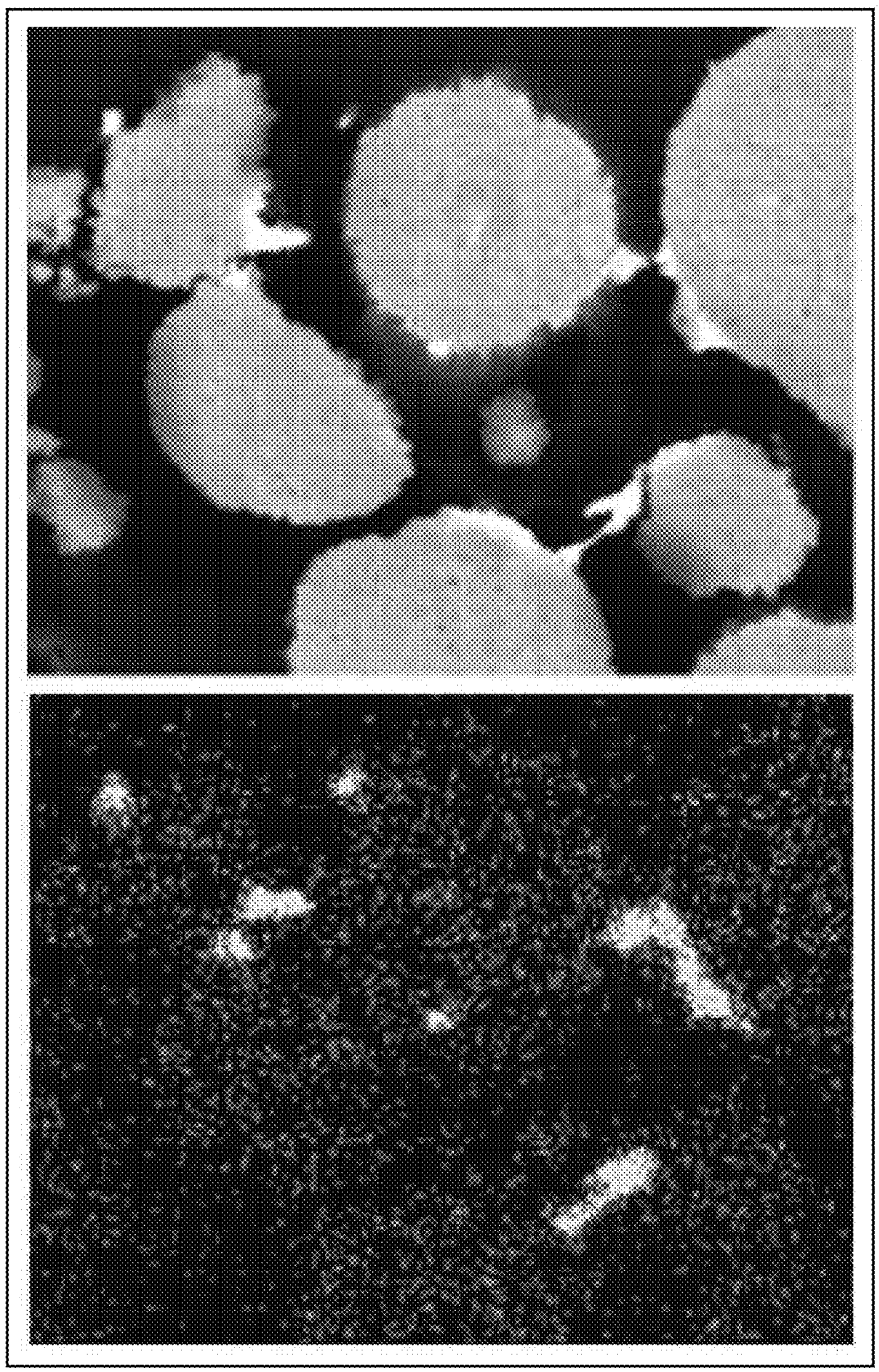
FIG. 1 shows the mapping results of a surface analysis on zinc according to Example 1.

1. Positive Electrode Active Material for Nonaqueous Electrolyte Secondary Battery A positive electrode active material for a nonaqueous electrolyte secondary battery according to the present embodiment (hereinafter simply referred to as "positive electrode active material") contains lithium nickel cobalt zinc composite oxide represented by general formula (1): $Li_wNi_{1-x-y-z}Co_xZn_yM_zO_2$ ($0.95 \le w \le 1.10$, $0.05 \le x \le 0.3$, $0.005 \le y \le 0.08$, $0 \le z \le 0.3$, where M is at least one metal element selected from the group consisting of Mg, Al, Ti, Mn, Fe, and Cu). The lithium nickel cobalt zinc composite oxide has a form of secondary particles each corresponding to an aggregation of primary particles of the hexagonal lithium-containing composite oxide with a layered structure. Zinc oxide exists in at least a part of the surface of the primary particles and/or the surface of the secondary particles, and the (003)-plane crystallite diameter obtained by X-ray diffraction and the Scherrer equation is 100 nm or larger and 160 nm or smaller.

That is to say, in this lithium nickel cobalt zinc composite oxide, zinc (Zn) is segregated on the surface of the primary particles (grain boundary) and the surface of the secondary particles so that the lithium nickel cobalt zinc composite oxide exists as zinc oxide. In addition, by controlling the (003)-plane crystallite diameter to be in the above range, the cycle characteristic of the lithium nickel cobalt zinc composite oxide when used as the positive electrode active material for the secondary battery can be improved.

(1) Composition Ratio

In the general formula (1), x representing the content of cobalt (Co) in the positive electrode active material satisfies the relation of $0.05 \le x \le 0.3$, preferably $0.07 \le x \le 0.2$. Co is the element that improves the cycle characteristic and the thermal stability, and by satisfying the above range, both the cycle characteristic and the thermal stability can be improved while the high battery capacity is maintained.

In the general formula (1), y representing the content of zinc (Zn) in the positive electrode active material satisfies the relation of $0.005 \le y \le 0.08$, preferably $0.01 \le y \le 0.05$. Containing Zn in the above range makes it possible to improve the cycle characteristic as described below. When y is less than 0.005, Zn that is segregated on the surface of the secondary particles and the primary particles is insufficient and the high cycle characteristic cannot be obtained. On the other hand, when y is more than 0.08, too much Zn is segregated on the surface of the secondary particles and the primary particles and is dissolved in the solid state in the primary particles, in which case the battery capacity decreases and the improvement of the cycle characteristic cannot be anticipated.

In the general formula (1), M is at least one metal element selected from the group consisting of Mg, Al, Ti, Mn, Fe, and Cu. Moreover, z representing the content of M in the positive electrode active material satisfies $0 \leq z \leq 0.3$, preferably $0 \leq z \leq 0.2$, and more preferably $0 \leq z \leq 0.1$. M can be added to improve battery characteristics such as the cycle characteristic and the safety. If z is more than 0.3, the battery characteristics such as the cycle characteristic and the safety are improved further but the battery capacity will decrease more. In order to maintain the battery capacity and additionally improve the other battery characteristics, it is more preferable to satisfy $0 \leq z \leq 0.1$.

In the general formula (1), w representing the molar ratio of lithium to the metal element (Me) other than lithium (the ratio Li/Me) satisfies $0.95 \leq w \leq 1.10$, preferably $0.98 \leq w \leq 1.05$. When the value of w is less than 0.95, the charging-discharging capacity is low. On the other hand, as the value of w is increased, the charging-discharging capacity becomes higher but the safety will be lower if w is more than 1.10.

The content of each component in the positive electrode active material can be measured by the quantitative analysis based on the inductively coupled plasma (ICP) method.

(2) Existence Form and Distribution of Zinc

The positive electrode active material according to the present embodiment contains lithium nickel cobalt zinc composite oxide having the form of the secondary particles each corresponding to the aggregation of the primary particles of the hexagonal lithium-containing composite oxide with the layered structure, and zinc (Zn) exists as zinc oxide in at least a part of the surface (grain boundary) of the primary particles and/or the surface of the secondary particles. Note that in this specification, the surface of the primary particles refers to the grain boundary part between the primary particles and the surface part of the primary particles that is in contact with the space within the secondary particles, and the surface of the secondary particles refers to the outer plane (surface) part of the secondary particles exposed to the outside.

As a result of detailed analysis on the distribution of zinc of the hexagonal lithium-containing composite oxide with the layered structure, the present inventors have found out: 1) the cycle characteristic is improved by dissolving zinc in the solid state in the primary particles, suppressing a change in Ni—O bonding distance after repeated charging and discharging, and maintaining the crystal structure, and 2) the cycle characteristic is further improved by having the zinc segregated partially and exist as zinc oxide on the surface of the primary particles and/or the surface of the secondary particles, relieving the contraction and expansion of the particles caused by the charging and discharging, and suppressing the collapse of the secondary particles.

The amount of zinc oxide existing on the surface of the primary particles and the surface of the secondary particles due to the segregation of zinc may be small, and it is difficult to measure the amount of segregation in the entire particles of the positive electrode active material. In the present embodiment, at least a part of zinc contained in the positive electrode active material exists as zinc oxide on the surface of the primary particles and/or the surface of the secondary particles, so that the segregation occurs in the entire surface of the particles. Thus, a sufficient effect is obtained to improve the cycle characteristic. Note that it is only necessary that zinc oxide exists on the surface of at least one of the primary particles and the secondary particles and zinc oxide may exist on both surfaces. In addition, it is only necessary that zinc oxide exists on at least a part of the surface of the primary particles and/or the secondary particles, and zinc oxide may exist on either the entire surface of the particles or a part of the surface thereof.

Zinc oxide existing on the surface of the primary particles and/or the surface of the secondary particles can be observed by the Scanning Electron Microscope-Energy Dispersive X-ray Spectroscopy (SEM-EDX). The size of the zinc oxide existing on the surface of these particles only needs to be large enough to be observed by the SEM-EDX and the maximum thickness of the coating layer of the zinc oxide existing on the surface of the primary particles and the surface of the secondary particles is preferably 0.3 μm or larger, preferably 0.3 μm or larger and 2 μm or smaller, and much more preferably 0.5 μm or larger and 2 μm or smaller. When the maximum thickness is in the above range, the cycle characteristic can be improved while a decrease in conductivity between the particles is suppressed. It is not necessary that the zinc oxide is observed in all the secondary particles used as the positive electrode active material, and it is only necessary that the zinc oxide is observed in at least 30% of the secondary particles. The maximum thickness of the coating layer of zinc oxide can be measured as the maximum width in the direction perpendicular to the surface of the primary particles or the secondary particles from the results of analyzing the surface of zinc by the Scanning Electron Microscope-Energy Dispersive X-ray Spectroscopy.

(3) (003)-Plane Crystallite Diameter

The (003)-plane crystallite diameter of the primary particles of the lithium nickel cobalt zinc composite oxide obtained by X-ray diffraction and the Scherrer equation is 100 nm or larger and 160 nm or smaller, preferably 120 nm or larger and 150 nm or smaller. By setting the (003)-plane crystallite diameter to be in the above range, the cycle characteristic can be improved. When the crystallite diameter is small, it can be said that the reaction with lithium in firing is not enough, and much lithium is excess, and gelation occurs when the battery is produced. If the crystallite diameter is too large, cation mixing occurs, resulting in deterioration in capacity and cycle characteristic.

(4) Average Particle Diameter

The average particle diameter of the secondary particles of the lithium nickel cobalt zinc composite oxide is preferably 3 μm or larger and 15 μm or smaller. By setting the average particle diameter in the above range, the filling with the positive electrode active material can be successfully performed, and moreover, both the excellent cycle characteristic and the safety can be achieved.

In regard to the lithium nickel cobalt zinc composite oxide, [(d90−d10)/average particle diameter] representing the spread of the grain size distribution is preferably 1.2 or less. By setting [(d90−d10)/average particle diameter] to be in the above range, containing microparticles and coarse particles is suppressed, so that the deterioration in cycle characteristic due to the concentration of the application on the microparticles and the decrease in battery capacity due to the coarse particles can be suppressed further. The lower limit value of [(d90−d10)/average particle diameter] is not limited to a particular value and is, for example, about 0.40.

Note that the average particle diameter, d90, and d10 can be measured from a volume integrated value measured with a laser diffraction particle size analyzer. The average particle diameter can be obtained by calculating the particle diameter at which the cumulative volume is 50% of the volume of the entire particles by using d50, which is similar to the case of using d90.

2. Method for Producing Positive Electrode Active Material for Nonaqueous Electrolyte Secondary Battery A method for producing the positive electrode active material for a nonaqueous electrolyte secondary battery according to the present embodiment includes: a step of mixing a lithium compound and a precursor of a positive electrode active material containing particular nickel composite hydroxide or a roasted precursor obtained by oxidizing roasting of the precursor, thereby obtaining a lithium mixture; and a step of firing the lithium mixture in an oxidizing atmosphere.

(1) Adjusting Precursor/Roasted Precursor

In the present embodiment, the precursor of the positive electrode active material is the nickel composite hydroxide represented by general formula (2): $Ni_{1-x-y-x}Co_xZn_yM_z(OH)_2$ ($0.05 \leq x \leq 0.3$, $0.005 \leq y \leq 0.08$, $0 \leq z \leq 0.3$, where M is at least one metal element selected from the group consisting of Mg, Al, Ti, Mn, Fe, and Cu), having a form of secondary particles corresponding to an aggregation of primary particles, and having at least a part of the surface of the secondary particles coated with zinc hydroxide.

The nickel composite hydroxide before being coated with zinc hydroxide can be obtained by a known method without a particular limitation, and a continuous crystallization method or a batch crystallization method is preferably used. By these methods, the particles of the nickel composite hydroxide having the form of the secondary particles corresponding to the aggregation of the primary particles can be obtained. In order to increase the density of the secondary particles, it is more preferable to use the continuous crystallization method.

In one example of the continuous crystallization method, predetermined amounts of water and ammonia water are put into a reaction tank to prepare a reaction liquid, the reaction liquid is stirred while the temperature of the liquid in the reaction tank is controlled to be constant, and an ammonia aqueous solution and a mixed aqueous solution containing a predetermined amount of nickel and cobalt are dropped to the reaction liquid. In this process, an alkali aqueous solution is dropped so that the pH of the solution in the reaction tank becomes constant to cause the neutralization crystallization; thus, the nickel composite hydroxide is obtained. Alternatively, nitrogen gas may be supplied to the reaction tank before the neutralization crystallization in order to avoid the contact between the air and the solution in the reaction tank.

The composition of the nickel composite hydroxide obtained by the neutralization crystallization only needs to be the composition that satisfies the range of the general formula (2) in the state that coating with zinc hydroxide is performed in a later step, but it is necessary to make an adjustment by decreasing zinc for the amount of zinc used for the coating in the later step. Therefore, in order to secure a sufficient amount of zinc oxide which will be segregated after the firing, it is preferable that $0 \leq y' \leq 0.02$, more preferably $0 \leq y' \leq 0.01$ is satisfied, where y' represents the content of zinc in the nickel composite hydroxide excluding zinc coating the surface.

The ratio of the metal elements of the precursor is maintained also in the positive electrode active material. Therefore, the composition of the precursor is adjusted so that the ratio of the metal elements of the precursor is the same as the ratio of the metal elements of the positive electrode active material. On the other hand, M can be added in a manner of coating the nickel composite hydroxide. In the case of coating, the content of M in the nickel composite hydroxide before coating with M is decreased for the amount of M to be added by coating.

The precursor used in the present embodiment contains the nickel composite hydroxide in which at least a part of the surface of the secondary particles is coated with zinc hydroxide. In this manner, coating the surface of the secondary particles with zinc hydroxide makes it possible to suppress the variation in zinc content between the secondary particles and to provide a uniform zinc content in the positive electrode active material.

For example, in the case of obtaining the positive electrode active material containing zinc by not coating the surface of the secondary particles with the zinc-containing compound and by mixing the nickel composite hydroxide and the zinc compound powder as disclosed in Patent Literature 1, the uniformity of the zinc content in the positive electrode active material will deteriorate and accordingly the battery characteristics will deteriorate. In the positive electrode active material obtained by the method as in the present embodiment in which the surface of the secondary particles of the nickel composite hydroxide is coated with zinc hydroxide, the amount of zinc dissolved in the solid state in the positive electrode active material can be reduced. Therefore, as compared to the positive electrode active material which employs the nickel composite hydroxide containing zinc obtained by a coprecipitation method or the like and in which the surface of the secondary particles is not coated with the zinc-containing compound, an excellent battery capacity and cycle characteristic can be achieved.

The method of coating with zinc hydroxide is not limited to a particular method and may be any method that makes the surface of the secondary particles coated with the zinc hydroxide, and the method that makes the entire surface of the secondary particles uniformly coated with the zinc hydroxide is preferable. In one example of the coating method, the secondary particles are made into slurry and the surface of the secondary particles is coated with zinc hydroxide. Specifically, it is preferable that the secondary particles of the nickel composite oxide whose surface is not coated with zinc hydroxide are made into slurry, and an aqueous solution containing zinc is dropped while the pH of the slurry is maintained to be 8.5 or higher and 10.5 or lower, more preferably 9.0 or higher and 10.0 or lower based on a liquid temperature of 25° C., so that at least a part of the surface of the secondary particles is coated with zinc hydroxide. If the pH of the slurry is out of the above range, zinc does not become hydroxide because zinc is an amphoteric metal, and in this case, the surface of the secondary particles is not coated with zinc.

The aqueous solution containing zinc is preferably a solution in which water-soluble zinc salt is dissolved in water. The zinc salt may be zinc sulfate, zinc chloride, zinc nitrate, or the like, and zinc sulfate is preferable from the points of the mixing of impurities and reactivity.

To adjust the pH of the slurry, an alkali aqueous solution can be used and is preferably a sodium hydroxide aqueous solution or a potassium hydroxide aqueous solution. More preferably, a sodium hydroxide aqueous solution is used.

In order to remove the impurities after the surface of the secondary particles is coated with zinc hydroxide, the nickel composite hydroxide may be washed with water and dried.

The precursor obtained by coating the surface of the secondary particles with zinc hydroxide is in the form of the composite hydroxide represented by general formula (2). The precursor in the form of the composite hydroxide may be mixed with the lithium compound but it is preferable that after the precursor is subjected to oxidizing roasting, the roasted precursor is mixed with the lithium compound. The roasted precursor is in the form of composite oxide in which at least a part of the composite hydroxide is oxidized. The form of the composite oxide facilitates the reaction with the lithium compound. The oxidizing roasting may be performed by a known method, such as heating in an oxidizing atmosphere. The heating temperature is a temperature at which the conversion into the composite oxide is possible, and is preferably 350° C. or higher and 750° C. or lower. By heating at 350° C. or higher and 750° C. or lower, the sufficient conversion into the composite oxide while suppressing the sintering of the secondary particles is possible. The heating time is usually about 1 to 12 hours, preferably 2 to 12 hours.

(2) Mixing Step

Next, the precursor or the roasted precursor is mixed with the lithium compound, and the resulting lithium mixture is fired in an oxidizing atmosphere.

The molar ratio of lithium to the metal element (Me) other than lithium in the lithium mixture, (Li/Me), is maintained even after the firing. Therefore, the Li/Me of the lithium mixture is preferably the composite ratio in the positive electrode active material, that is, 0.95 or more and 1.10 or less.

On the other hand, in the case of performing water-washing after the firing, Li/Me decreases with the water-washing. Therefore, in the case of performing the water-washing, it is preferable that the precursor and the lithium compound are mixed considering the decrease in Li/Me. How much the Li/Me decreases varies depending on the firing condition or the water-washing condition but is approximately 0.05 to 0.1, and the decrease amount can be known by producing a small amount of the positive electrode active material as a preliminary test. In the case of performing the water-washing, the upper limit of Li/Me in the lithium mixture may be, for example, 1.20 or less.

The lithium compound is not limited to a particular compound but is preferably lithium hydroxide, lithium nitrate, lithium carbonate, a hydrate thereof, or the like from the viewpoint of high accessibility. A mixture containing any of these may also be used. Above all, lithium hydroxide or a hydrate thereof is more preferably used from the viewpoints of easy handling and reactivity with the precursor.

It is preferable that the lithium mixture is sufficiently mixed before the firing. If the mixing is insufficient, a problem may occur in that sufficient battery characteristics cannot be obtained due to variation in Li/Me between the particles, and the like. The mixing may be performed using a conventional mixer, for example, a shaker mixer, a Loedige mixer, a Julia mixer, a V blender, or the like. It is only necessary that the precursor/roasted precursor and the lithium compound are mixed sufficiently to such a degree that the form of the secondary particles is not destroyed.

(3) Firing Step

The lithium mixture obtained by the mixing is fired in the oxidizing atmosphere, so that the positive electrode active material is obtained. The firing temperature is preferably 700° C. or higher and 830° C. or lower, more preferably 700° C. or higher and 800° C. or lower, and much more preferably 700° C. or higher and 760° C. or lower. Firing the lithium mixture causes lithium of the lithium compound to diffuse in the precursor or the precursor converted into the composite oxide. Thus, the lithium nickel cobalt zinc composite oxide is formed. If the firing temperature is lower than 700° C., the diffusion of lithium into the precursor is insufficient, in which case the excess lithium or the unreacted particles remain or the crystal structure is not aligned sufficiently. This results in a problem in that the sufficient battery characteristics are not obtained. If the firing temperature is more than 830° C., the particles of the lithium nickel cobalt zinc composite oxide are intensively sintered and the grains grow abnormally. If the abnormal grain growth occurs, the fired particles become coarse and the particles may fail to maintain the particulate form. In this case, when the positive electrode active material is formed, the specific surface area decreases to make the resistance of the positive electrode increase, resulting in a problem in that the battery capacity decreases.

The firing time is preferably at least 3 hours or more, more preferably 6 hours or more and 24 hours or less. If the firing time is less than 3 hours, the generation of the lithium nickel cobalt zinc composite oxide may be insufficient.

The firing is performed under the oxidizing atmosphere, and the oxygen concentration is preferably 18% by volume or more and 100% by volume or less. That is, the firing is preferably performed in the air or the oxygen air flow. If the oxygen concentration is less than 18% by volume, the sufficient oxidation is impossible, and therefore, the crystallinity of the primary particles of the lithium nickel cobalt zinc composite oxide may be insufficient. In consideration of the battery characteristics, the firing is performed more preferably in the oxygen air flow.

In the firing step, it is preferable that before the firing at a temperature of 700° C. or higher and 830° C. or lower, the preliminary firing is carried out at a temperature which is lower than the firing temperature and at which the lithium compound and the precursor/roasted precursor can react. By maintaining the lithium mixture at such a temperature, lithium can be sufficiently diffused in the precursor/roasted precursor and the lithium nickel cobalt zinc composite oxide with the excellent crystallinity can be obtained. For example, when lithium hydroxide or its hydrate is used, the preliminary firing is preferably carried out with the temperature maintained at 400° C. or higher and 550° C. or lower for about 1 to 10 hours.

The furnace used for the firing is not limited to a particular furnace and may be any furnace that can fire the lithium mixture in the air or the oxygen air flow. The furnace is preferably an electric furnace that does not generate gas, and either a batch type or a continuous furnace can be used.

In the lithium nickel cobalt zinc composite oxide obtained by the firing, the sintering between the particles is suppressed but the weak sintering or the aggregation can lead to the formation of coarse particles. In this case, it is preferable that the particle size distribution is adjusted by eliminating the sintering or the aggregation through crushing.

3. Nonaqueous Electrolyte Secondary Battery

Detailed description is made of each component of the nonaqueous electrolyte secondary battery according to the present embodiment. The nonaqueous electrolyte secondary battery includes a positive electrode, a negative electrode, a nonaqueous electrolyte solution, and the like, which are similar to the components of the general lithium ion secondary batteries. The embodiment to be described below is merely an example, and in addition to the embodiment below, the nonaqueous electrolyte secondary battery according to the present invention can be variously modified and changed based on the knowledge of a person skilled in the art. The intended purpose of the nonaqueous electrolyte secondary battery according to the present invention is not limited to a particular purpose.

(1) Positive Electrode

One example of a positive electrode mixture for forming the positive electrode and each material included in the positive electrode mixture will be described. First, the positive electrode active material (powder) according to the present embodiment described above, a conductive material, and a binding agent (binder) are mixed, and if necessary, activated carbon and solvent for adjusting the viscosity or the like are added thereto. The mixture is kneaded to produce positive electrode mixture paste. In accordance with the required performance of the lithium secondary battery, the mixing ratio for the positive electrode mixture may be adjusted as appropriate.

For example, when the entire mass of the solid content of the positive electrode mixture excluding the solvent is 100% by mass, the positive electrode active material may be contained by 60 to 95% by mass, the conductive material may be contained by 1 to 20% by mass, and the binding agent may be contained by 1 to 20% by mass, which is similar to the positive electrode of the general lithium secondary battery.

The obtained positive electrode mixture paste is applied on a surface of a current collector made of an aluminum foil, and then dried so that the solvent is scattered. If necessary, pressure may be applied by roll pressing or the like in order to increase the electrode density. In this manner, a sheet-shaped positive electrode can be produced. The sheet-shaped positive electrode can be, for example, cut into an appropriate size in accordance with the intended battery, so as to be used for the production of the battery. The method for producing the positive electrode is not limited to the described one, and other methods may be used.

The conductive material is not limited to a particular material and may be, for example, graphite (natural graphite, artificial graphite, expanded graphite, or the like) or carbon black such as acetylene black or Ketjen black.

The binding agent (binder) is to bind the active material particles and is not limited to a particular agent. The binding agent may be, for example, fluorine-containing resin such as polytetrafluoroethylene, polyvinylidene fluoride, or fluorine rubber, thermoplastic resin such as polypropylene, polyethylene, ethylene propylenediene rubber, styrene butadiene, or polyacrylate, cellulose resin, or the like.

If necessary, a solvent that diffuses the positive electrode active material, the conductive material, and activated carbon and dissolves the binding agent is added to the positive electrode mixture. As the solvent, specifically, an organic solvent such as N-methyl-2-pyrrolidone can be used. The activated carbon can be added to the positive electrode mixture in order to increase the electric double layer capacitance.

(2) Negative Electrode

The negative electrode is metal lithium, a lithium alloy, or the like, or can be formed in a manner that: a negative electrode mixture in a paste form is obtained by mixing the binding agent in the negative electrode active material capable of intercalating/deintercalating lithium ions, and adding an appropriate solvent; and the negative electrode mixture is applied on a surface of a metal foil current collector, such as copper, dried and compressed if necessary in order to increase the electrode density.

The negative electrode active material may contain a carbon material, for example, powder of a carbon substance, such as natural graphite, artificial graphite, a fired organic compound such as phenol resin, and coke, or a material formed by a combination thereof. In this case, the negative electrode binding agent may be, for example, a fluorine-containing resin such as polyvinylidene fluoride, and the solvent that diffuses the active material and the binding agent may be an organic solvent such as N-methyl-2-pyrrolidone, which is similar to the case of the positive electrode.

(3) Separator

A separator is held between the positive electrode and the negative electrode. The separator is to separate the positive electrode from the negative electrode and hold the electrolyte. A thin film of polyethylene, polypropylene, or the like having a number of microscopic holes can be used as the separator.

(4) Nonaqueous Electrolyte Solution

The nonaqueous electrolyte solution is a solution having lithium salt as the supporting electrolyte dissolved in an organic solvent. The organic solvent may be formed by single kind or two or more kinds selected from: cyclic carbonates such as ethylene carbonate, propylene carbonate, butylene carbonate, and trifluoropropylene carbonate; chained carbonates such as diethyl carbonate, dimethyl carbonate, ethylmethyl carbonate, and dipropyl carbonate; ether compounds such as tetrahydrofuran, 2-methyltetrahydrofuran, and dimethylethane; sulfur compounds such as ethylmethylsulfone and butanesultone; and phosphorus compounds such as triethyl phosphate and trioctyl phosphate.

The supporting electrolyte may be $LiPF_6$, $LiBF_4$, $LiClO_4$, $LiAsF_6$, $LiN(CF_3SO_2)_2$, or the like, or a compound electrolyte thereof.

In addition, the nonaqueous electrolyte solution may contain a radical scavenger, a surfactant, a retardant, or the like.

(5) Shape and Structure of Battery

The nonaqueous electrolyte secondary battery including the positive electrode, the negative electrode, the separator, and the nonaqueous electrolyte solution described as above can have various shapes including a cylindrical shape and a stacked shape.

In any shape, the positive electrode and the negative electrode are stacked with the separator interposed therebetween to form an electrode stack, and this electrode stack is impregnated with the nonaqueous electrolyte solution. A current collector lead or the like is used to connect between a positive electrode current collector and a positive electrode terminal connecting to the outside, and between a negative electrode current collector and a negative electrode terminal connecting to the outside, and then this is sealed in a battery case. Thus, the battery is completed.

EXAMPLES

The present invention will hereinafter be described in more detail with reference to Examples and Comparative Examples of the present invention but the present invention is not limited by these examples.

Example 1

[Method for Producing Positive Electrode Active Material]
(Production of Composite Hydroxide)

Nickel sulfate and cobalt sulfate were mixed to prepare a mixed aqueous solution with a nickel concentration of 1.6 mol/L and a cobalt concentration of 0.3 mol/L. To a reaction tank, 900 mL of pure water, 8.5 mL of sodium hydroxide aqueous solution of 25% by mass, and 45 mL of ammonia aqueous solution of 25% by mass were added to produce a reaction liquid. While the liquid temperature was maintained at 50° C., nitrogen gas was supplied to the reaction tank so that the liquid in the reaction tank was not exposed to the air. While the reaction liquid was stirred, the mixed aqueous solution was supplied and moreover a sodium hydroxide aqueous solution of 25% by mass was added to make the solution in the reaction tank have a pH of 11.2 (based on a liquid temperature of 25° C.). By the coprecipitation method, nickel composite hydroxide (nickel cobalt composite hydroxide) containing spherical secondary particles was generated.

(Coating with Zinc Hydroxide)

The generated nickel composite hydroxide was separated into solid and liquid through filtration, and then it was put into another tank containing 3 L of pure water and the mixture was diffused using a stirrer. The sodium hydroxide aqueous solution of 25% by mass was added so that the pH based on a liquid temperature of 25° C. was maintained at 9.0. At the same time, a zinc sulfate aqueous solution prepared so that the molar ratio of zinc to the metal elements (Ni+Co+Zn) became 0.01 (1 atom %) was dropped. This made the surface of the nickel composite hydroxide coated with zinc hydroxide. After that, the solution was separated into solid and liquid through filtration and the nickel composite hydroxide coated with zinc hydroxide was cleaned and dried at 120° C. Thus, a precursor $Ni_{0.83}Co_{0.16}Zn_{0.01}(OH)_2$ was obtained.

(Oxidizing Roasting)

The obtained precursor placed in the sagger made of cordierite was maintained at 700° C. for 10 hours in the atmosphere using an electric furnace, so that the precursor was converted into composite oxide.

(Mixing and Firing)

After the obtained composite oxide and a commercial lithium hydroxide were weighed so that Li/Me became 1.02, these were sufficiently mixed using a shaker mixer device (TURBULA Type T2C, manufactured by Willy A. Bachofen (WAB)) with the strength of such a degree that the form of this composite oxide was maintained. Thus, a lithium mixture was obtained. This lithium mixture was placed in the sagger of cordierite and the temperature was increased up to 500° C. in the oxygen air flow using a sealed electric furnace. After the temperature was maintained at 500° C. for three hours, the temperature was increased up to 750° C. and maintained for 10 hours. After the temperature was maintained at 750° C., the furnace was cooled down to room temperature. Then, the mixture was extracted from the sagger and crushed. Thus, the positive electrode active material was obtained.

[Evaluation of Positive Electrode Active Material]

(Zinc Distribution)

The obtained positive electrode active material was subjected to a surface analysis to obtain the zinc distribution by the Scanning Electron Microscope-Energy Dispersive X-ray Spectroscopy (SEM-EDX). For the surface analysis, FE-SEM (S-4700) manufactured by Hitachi High-Technologies Corporation was used as the scanning electron microscope and Gensis manufactured by EDAX was used for the analysis. FIG. 1 shows the mapping results of the surface analysis of zinc (left side: the SEM image of the surface of the positive electrode active material, right side: Zn distribution). As shown in FIG. 1, intense fluorescence was detected on a part of the surface of the secondary particles and zinc was segregated on the surface of the secondary particles. Moreover, the fluorescence was detected on the surface of the primary particles inside the secondary particles and zinc was segregated on the surface of the primary particles.

(Composition)

The composition of the obtained positive electrode active material was analyzed by a quantitative analysis by the ICP spectrometry. The composition is shown in Table 1.

(Crystallite Diameter)

The crystallite diameter was calculated using the Scherrer equation and the half-width and 2θ of the (003)-plane in the diffraction pattern obtained by the XRD measurement of the positive electrode active material. The crystallite diameter is shown in Table 1.

(Average Particle Diameter, Particle Size Distribution)

The average particle diameter and the [(d90-d10)/average particle diameter] value expressing the particle size distribution were obtained by calculation based on the volume integrated value measured using a laser diffraction particle size analyzer (manufactured by NIKKISO CO., LTD., Microtrac HRA).

(Evaluation of Battery Characteristics of Positive Electrode Active Material)

Figure 2:
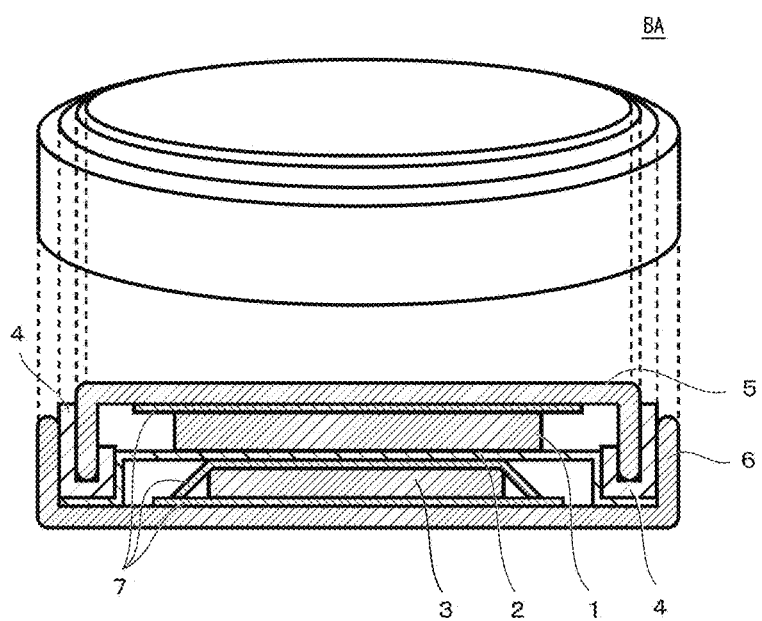
FIG. 2 is a cross-sectional view of a coin battery used in a battery evaluation.

The initial capacity and the cycle characteristic (capacity retention) of the obtained positive electrode active material were evaluated as below. FIG. 2 illustrates a 2032-type coin battery BA (hereinafter referred to as coin battery) used to evaluate the initial discharging capacity and the capacity retention of the electrode active material. The coil battery BA includes a lithium metal negative electrode 1, a separator 2, and a positive electrode 3 arranged in this order as illustrated in FIG. 2, so that the negative electrode 1 is in contact with an inner surface of a negative electrode can 5 and the positive electrode 3 is in contact with an inner surface of a positive electrode can 6. The coin battery BA includes a gasket 4 between the negative electrode can 5 and the positive electrode can 6.

The coin battery BA was produced as below.

To 90% by mass of positive electrode active material powder, 5% by mass of acetylene black and 5% by mass of polytetrafluoroethylene (PTFE) were mixed and n-methyl-pyrrolidone was added to make the mixture paste. This paste was applied to a 20-μm-thick aluminum foil so that the dried positive electrode active material had a weight of 0.05 g/cm$^2$. Then, drying was performed at 120° C. in vacuum, and the dried paste was punched into a circular plate shape with a diameter of 1 cm to provide the positive electrode 3.

The negative electrode 1 was formed of lithium metal and the electrolyte solution was formed of a mixed solution containing the same amount of diethyl carbonate (DEC) and ethylene carbonate (EC) using 1 M of $LiClO_4$ as the supporting electrolyte. The separator 2 formed of polyethylene was impregnated with the electrolyte solution and then the coin battery BA was produced in a glove box with the Ar gas atmosphere whose dew point was controlled to be −80° C.

The produced coin battery BA was left for about 24 hours and after open circuit voltage OCV became stable, the coin battery BA was charged with constant current and constant voltage at a rate of 1 C up to 4.3 V at a temperature of 25° C. After a 10 minute rest, the coin battery BA was discharged with the constant current up to 3.0 V at the same rate, which is followed by another 10 minute rest. This charging-discharging cycle is repeated 100 times. The discharging capacity in the first cycle and the discharging capacity in the 100th cycle were measured. Using the discharging capacity in the first cycle as the initial discharging capacity, the percentage of the discharging capacity in the 100th cycle relative to the initial discharging capacity was obtained as the capacity retention (%).

The initial discharging capacity and the capacity retention are shown in Table 1.

Example 2

A positive electrode active material according to Example 2 was obtained and evaluated using the nickel composite hydroxide obtained in Example 1, in a manner similar to Example 1 except that a zinc sulfate aqueous solution prepared so that the zinc molar ratio became 0.05 (5 atom %) in the coating with zinc hydroxide was used. The crystallite diameter, the initial discharging capacity, and the capacity retention are shown in Table 1.

Comparative Example 1

A positive electrode active material according to Comparative Example 1 was obtained and evaluated in a manner similar to Example 1 except that a mixed aqueous solution formed by mixing nickel sulfate, cobalt sulfate, and zinc sulfate and having a nickel concentration of 1.6 mol/L, a cobalt concentration of 0.3 mol/L, and a zinc concentration of 0.02 mol/L was prepared and used, and that the precursor $Ni_{0.83}Co_{0.16}Zn_{0.01}(OH)_2$ was obtained without the coating with zinc hydroxide. The crystallite diameter, the initial discharging capacity, and the capacity retention are shown in Table 1.

Comparative Example 2

A positive electrode active material according to Comparative Example 2 was obtained and evaluated in a manner similar to Example 1 except that the coating with zinc hydroxide was not performed and the nickel composite hydroxide obtained in Example 1 was used as the precursor. The crystallite diameter, the initial discharging capacity, and the capacity retention are shown in Table 1.

where zinc was not added but was lower than that of Examples. In Comparative Example 2, the capacity retention was less than 95% and deterioration due to the repeated charging-discharging cycles is significant, which is a problem in battery design.

INDUSTRIAL APPLICABILITY

The nonaqueous electrolyte secondary battery according to the present invention with the high initial capacity and the excellent cycle characteristic is suitably used for devices always required to have high capacity and long life, and above all, particularly suitably used for the power source of small portable electronic devices.

DESCRIPTION OF REFERENCE SIGNS

1 lithium metal negative electrode
2 separator (impregnated with electrolyte solution)
3 positive electrode (electrode for evaluation)
4 gasket
5 negative electrode can
6 positive electrode can
7 current collector

The invention claimed is:
1. A positive electrode active material for a nonaqueous electrolyte secondary battery, the positive electrode active material comprising lithium nickel cobalt zinc composite oxide represented by general formula (1): $Li_wNi_{1-x-y-z}Co_xZn_yM_zO_2$
   where $0.95 \leq w \leq 1.10$, $0.05 \leq x \leq 0.3$, $0.005 \leq y \leq 0.08$, and $0 \leq z \leq 0.3$, where M is at least one metal element selected from the group consisting of Mg, Al, Ti, Mn, Fe, and Cu, wherein
   the lithium nickel cobalt zinc composite oxide has a form of secondary particles each corresponding to an aggregation of primary particles of hexagonal lithium-containing composite oxide with a layered structure, contains zinc oxide on at least a part of a surface of the primary particles and/or a surface of the secondary particles, and has a (003)-plane crystallite diameter of 100 nm or larger and 160 nm or smaller, the diameter being obtained by X-ray diffraction and Scherrer equation.
2. The positive electrode active material for a nonaqueous electrolyte secondary battery according to claim 1, wherein the (003)-plane crystallite diameter is 120 nm or larger and 150 nm or smaller.
3. The positive electrode active material for a nonaqueous electrolyte secondary battery according to claim 1, wherein

TABLE 1

| | $Li_wNi_{1-x-y-z}Co_xZn_yM_zO_2$ | Zinc added by | Average particle diameter μm | Particle size distribution (d90 − d10)/average particle diameter | Crystallite diameter nm | Initial discharging capacity mAh/g | Capacity retention % |
|---|---|---|---|---|---|---|---|
| Example 1 | $Li_{1.02}Ni_{0.83}Co_xZn_{0.01}O_2$ | Coating (zinc hydroxide) | 11.5 | 0.83 | 147 | 165.8 | 97.1 |
| Example 2 | $Li_{1.02}Ni_{0.80}Co_{0.15}Zn_{0.05}O_2$ | Coating (zinc hydroxide) | 11.8 | 0.85 | 137 | 153 | 96.4 |
| Comparative Example 1 | $Li_{1.02}Ni_{0.83}Co_{0.16}Zn_{0.01}O_2$ | Coprecipitation | 11.7 | 0.84 | 141 | 151.8 | 95.6 |
| Comparative Example 2 | $Li_{1.02}Ni_{0.84}Co_{0.16}O_2$ | — | 11.4 | 0.83 | 155 | 171.1 | 94.6 |

[Evaluation]

In Examples 1 and 2, it has been confirmed that the capacity retention was as high as 96% or more and a stable discharging capacity was achieved even after the repeated charging-discharging cycles. On the other hand, in Comparative Example 1 in which zinc was added by the same amount as that of Example 1 by the neutralization crystallization method (the coprecipitation method), the capacity retention was higher than that of Comparative Example 2 the secondary particles have an average particle diameter of 3 μm or larger and 15 μm or smaller, and an indication [(d90−d10)/average particle diameter] expressing spread of a particle size distribution is 1.2 or less.

4. A method for producing a positive electrode active material for a nonaqueous electrolyte secondary battery, the method comprising a step of mixing a lithium compound with a precursor of the positive electrode active material or a roasted precursor obtained by oxidizing roasting of the precursor to obtain a lithium mixture, and a step of firing the lithium mixture obtained in the mixing in an oxidizing atmosphere, wherein the precursor contains nickel composite hydroxide represented by general formula (2): $Ni_{1-x-y-z}Co_xZn_yM_z(OH)_2$ where $0.05 \leq x \leq 0.3$, $0.005 \leq y \leq 0.08$, $0 \leq z \leq 0.3$, where M is at least one metal element selected from the group consisting of Mg, Al, Ti, Mn, Fe, and Cu, has a form of secondary particles each corresponding to an aggregation of primary particles, and has at least a part of a surface of the secondary particles coated with zinc hydroxide.

5. The method for producing a positive electrode active material for a nonaqueous electrolyte secondary battery according to claim 4, wherein the method further comprising, before the step of mixing, a step of obtaining the precursor by dropping an aqueous solution containing zinc to slurry of the secondary particles with a surface being uncoated with zinc hydroxide while a pH of the slurry is maintained at 8.5 or higher and 10.5 or lower, and coating at least a part of the surface of the secondary particles with zinc hydroxide.

6. The method for producing a positive electrode active material for a nonaqueous electrolyte secondary battery according to claim 5, wherein the pH of the slurry is maintained at 9.0 or higher and 10.0 or lower.

7. The method for producing a positive electrode active material for a nonaqueous electrolyte secondary battery according to claim 4, wherein the lithium compound is lithium hydroxide or a hydrate thereof.

8. The method for producing a positive electrode active material for a nonaqueous electrolyte secondary battery according to claim 4, wherein in the step of firing, the lithium mixture is fired in a range of 700° C. or higher and 830° C. or lower.

9. A nonaqueous electrolyte secondary battery comprising the positive electrode active material for a nonaqueous electrolyte secondary battery according to claim 1 for a positive electrode.

* * * * *